US008565670B2

(12) United States Patent
Antikidis (10) Patent No.: US 8,565,670 B2
(45) Date of Patent: Oct. 22, 2013

(54) GRID OF GROUND STATIONS FOR RECEIVING AND STORING SATELLITE DATA

(75) Inventor: Jean-Pierre Antikidis, Castanet (FR)

(73) Assignee: Centre National d'Etudes Spatiales (CNES), Paris (FR)

( * ) Notice: Subject to any disclaimer, the term of this patent is extended or adjusted under 35 U.S.C. 154(b) by 381 days.

(21) Appl. No.: 13/061,197

(22) PCT Filed: Aug. 21, 2009

(86) PCT No.: PCT/FR2009/051614
§ 371 (c)(1),
(2), (4) Date: Apr. 18, 2011

(87) PCT Pub. No.: WO2010/037939
PCT Pub. Date: Apr. 8, 2010

(65) Prior Publication Data
US 2011/0188548 A1  Aug. 4, 2011

(30) Foreign Application Priority Data

Aug. 28, 2008 (FR) .................................... 08 04742
Jul. 15, 2009 (FR) .................................... 09 03453

(51) Int. Cl.
*H04H 20/74* (2008.01)
(52) U.S. Cl.
USPC ...................................... 455/3.02; 455/404.2
(58) Field of Classification Search
USPC ............. 455/3.01, 3.02, 42.7, 12.1, 127, 13.2
See application file for complete search history.

(56) References Cited

U.S. PATENT DOCUMENTS

| 5,883,584 A | 3/1999 | Langemann et al. |
| 2004/0215931 A1 | 10/2004 | Ellis |
| 2008/0043663 A1* | 2/2008 | Youssefzadeh et al. ...... 370/321 |

FOREIGN PATENT DOCUMENTS

| GB | 2432486 | 5/2007 |
| JP | H08251093 A | 9/1996 |
| JP | 2001196993 A | 7/2001 |
| WO | 2007000794 A1 | 1/2007 |

OTHER PUBLICATIONS

International search report dated Mar. 3, 2010 in corresponding PCT/FR2009051614.
Teo Y M et al., "Dsitributed geo-rectification of satellite images using grid computing", Parallel and Distributed processing Symposium, Apr. 22-26, 2003, Piscataway, NY, USA, IEEE, Apr. 22, 2003, pp. 15-22, XP010645301, ISBN: 978-0-7695-1926-5, Abstract and "1. Introduction".

* cited by examiner

*Primary Examiner* — Tu X Nguyen
(74) *Attorney, Agent, or Firm* — Young & Thompson (57) ABSTRACT

A device, referred to as a satellite grid, includes a plurality of reception and storage ground stations (5) provided with a storage unit (13), each station (5) including elements for receiving observation data from at least one satellite orbiting around the Earth. Each station (5) is connected to at least one digital network (15) and includes at least one management module so that the different stations cooperate together in order to provide a permanent and transparent shared access to the observation data coming from at least one satellite and stored in the different stations (5), wherein the satellite grid is adapted to be accessible and viewed as a single computer resource from any access point in the network (15).

15 Claims, 3 Drawing Sheets

GRID OF GROUND STATIONS FOR RECEIVING AND STORING SATELLITE DATA

The invention relates to a device, referred to throughout the text as a "satellite grid", comprising a plurality of data reception and recording terrestrial stations communicating with one another. A data reception and recording terrestrial station is a station provided with means for receiving observation data coming from at least one satellite in orbit around the Earth and with means for storing these data (bulk memory/memories).

The invention also relates to an observation device—in particular for observation of the Earth—comprising:
- at least one constellation of satellites deployed in orbit around the Earth, each satellite comprising at least one observation data acquisition device, and at least one device for transmitting these observation data to reception antennas located on the surface of the Earth,
- a plurality of observation data reception and recording terrestrial stations distributed on the surface of the Earth, each reception and recording terrestrial station being connected to at least one reception antenna—in particular to a reception antenna which belongs to it, these stations communicating with one another,
- the transmission device of each satellite being adapted to be able to transmit observation data to any reception antenna located in a field of view of this transmission device, each reception antenna being adapted to be able to receive observation data transmitted by a satellite when said reception antenna is located in the field of view of the transmission device of said satellite.

In general, throughout the text, the term "observation" refers to any acquisition of data, including measurements of physical parameters (temperatures, radiation, topographical data, images in the various visible or invisible wavelengths, etc.) and the term "observation of the Earth" refers to any acquisition of observation data relating to the Earth—in particular coming from the Earth.

It is an object of the invention in particular (although not exclusively) to provide such a device for observation of the Earth which is more particularly intended to acquire and provide terrestrial observation images and has a high ground resolution (10 meters or less, in particular of the order of one meter) and a high global coverage frequency of the Earth (2 weeks or less, in particular of the order of one day).

Throughout the text, the global coverage frequency of the Earth refers to the frequency with which an observation device makes it possible to take a complete image of the Earth.

Observation of the Earth by instruments on satellites began in the 1950s with the development of instruments dedicated in particular to meteorology. Such instruments have continued to be developed constantly since then, while alternatively favoring the ground resolution or the refresh frequency, depending on the intended applications.

There are currently a large number of terrestrial observation instruments, including LANDSAT, MODIS, IKONOS, QUICK BIRD, EROS, SPOT-5, SPOT-4, etc. These instruments make it possible to meet numerous imagery requirements in fields as varied as agriculture, cartography, cadastral surveying, defense, the environment, urban planning, telecommunications, risk management, renewable resource management, etc. In all cases, the observation data received by the ground stations from the satellites are collected in a central processing and archiving site making it possible to rationalize these various data, update them, and make them mutually coherent in a selected way. Such a central site also makes it possible to distribute the observation data to users coherently and uniformly in relation to their date and their content. Such migration of satellite observation data to a central site often raises problems of connection and bandwidth, in view of the very large volume of these data. For example, GB 2432486 proposes reuse of the satellites of the constellation in order to migrate the data to a ground user station. Such a solution is extremely expensive and complex, and not entirely satisfactory.

The instruments IKONOS, QUICKBIRD, EROS, etc., are satellites with a very high resolution, which permit ground resolutions of the order of one meter. On the other hand, they have refresh rates for the entire globe of more than one month.

The instruments MODIS, MERIS, etc. are instruments which have low resolutions but high refresh rates for the entire globe, of the order of 3 days to one week.

In other words, in view of the prior art, the design of an instrument for acquiring and providing observation satellite data—in particular for terrestrial observation—is subject to conflicting constraints. There is thus a choice between an instrument with a high spatial resolution—of the order of one meter—but with a low global coverage frequency—of the order of one week or one month—and an instrument with a high global coverage frequency—of the order of one day—but with a low spatial resolution—of the order of 100 meters.

Alternative solutions have been proposed in order to be able to benefit from a high coverage frequency of predetermined specific regions, while benefiting from an advantageous spatial resolution. They consist in employing one or more satellites equipped with optical instruments for image acquisition, which are adapted to allow realignment of these instruments. Specifically, the ability to acquire images outside the natural track of a satellite allows the same geographical region to be observed during several successive rotations of the satellite.

For example, the SPOT constellation of satellites offers an acquisition capacity and a refresh rate which make it possible to acquire an image of a predetermined region of the globe every day. This constellation comprises a plurality of satellites which are placed on a polar, circular, heliosynchronous orbit in phase with respect to the Earth. Each satellite has a cycle of 26 days. Each satellite comprises optical instruments, data recorders and systems for transmitting images to the reception stations on the ground. The optical instruments are adapted to ensure parameterizable oblique sighting, so that the same region can be observed several times during the 26 day cycle. The data recorders make it possible to store the images on board, if the satellite is not visible to a ground station.

This constellation can thus have a high coverage frequency of a specific region of the Earth. Nevertheless, the global coverage frequency cannot be less than 26 days. Furthermore, if the constellation is programmed so that numerous realignments are carried out during the 26 day cycle, the global coverage frequency of the Earth may be much more than 26 days.

Another drawback of such a solution resides in the cost of manufacture, installation, management and maintenance of a constellation of satellites with realignment. In particular, such a constellation requires installation and management on the ground of a plurality of ground stations typically operated autonomously with respect to one another and adapted to send the received images to a central server for backing up the images with a view to their distribution. Furthermore, each instrument of each satellite is controlled from the ground by a team of specialists responsible for determining and optimizing the realignments of the optical instruments according to requirements. Additionally, each satellite must comprise recorders in order to overcome a lack of ground station visibility. Each satellite furthermore comprises a specific system for transmission to the ground.

Moreover, such a solution encounters a major practical difficulty. Specifically, covering the entire terrestrial globe with such a constellation of satellites with a view to providing images having a spatial resolution of the order of one meter and a global coverage frequency of the order of one day requires the central server to manage of the order of 1500 terabytes of data per day, i.e. 170 gigabytes per second, greatly exceeding the capacities for satellite transmission and ground processing accessible with the technologies and architectures of servers currently available. Furthermore, the same problem arises for the data coming from instruments for observing space from satellites.

It is an object of the invention to overcome these drawbacks, to resolve these difficulties and to provide a new concept of a satellite observation data recording device which makes it possible to record extremely high data rates, in particular ones which may exceed 100 gigabytes per second. More particularly, it is an object of the invention to provide such a device which does not require a central server for distribution and/or recording of the data.

It is also an object of the invention to provide such a device—in particular an observation device—which is adapted to supply the mass information media available on the Internet.

To this end, the invention relates to a device comprising a plurality of data reception and recording terrestrial stations provided with storage means for storing data, each reception and recording terrestrial station being associated with means for receiving observation data coming from at least one satellite in orbit around the Earth, wherein:

the observation data received from at least one satellite—in particular each of said at least one satellite—are and remain distributed in said storage means of the various reception and recording terrestrial stations, each reception and recording terrestrial station is functionally connected to the other reception and recording terrestrial stations by at least one digital network and is provided with at least one module, called a management module, adapted so that the various reception and recording terrestrial stations are interconnected with one another by the various management modules via said at least one digital network, according to an architecture, called a satellite grid, adapted to allow permanent and transparent shared access to said observation data coming from at least one satellite—in particular from each of said at least one satellite—which are recorded in a distributed fashion in said storage means of the various reception and recording terrestrial stations, said satellite grid being adapted to make all the observation data distributed in the various reception and recording terrestrial stations accessible and viewed as a single set of observation data from any access point of said at least one digital network.

Such a satellite grid according to the invention, in which a plurality of terrestrial stations for reception and recording of satellite data are functionally interconnected with one another in order to share automatically, permanently, and totally transparently the observation data which are and remain recorded in each station, and therefore distributed within the various reception and recording terrestrial stations without being migrated to a central site, constitutes a new object fully revolutionizing the design and the mode of operation of the satellite observation instruments incorporating it. Specifically, such a satellite grid according to the invention is a constituent element of one or more observation device(s) in so far as such an observation device becomes entirely inoperative without the satellite grid according to the invention.

Furthermore, a device according to the invention has novel functionalities: the recording capacities of such a device are virtually unlimited, since it is sufficient to multiply the number of reception and recording terrestrial stations in order to increase the recording capacities and the data rate (within the limits of the data rate which can be sent by the corresponding satellites); no central server for referencing the data or for distributing the data is necessary; all the observation data are available from any access point of the satellite grid, immediately and in real time; operation of the device is automatically ensured, without requiring any specific maintenance (in particular, a breakdown of any one of the reception and recording terrestrial stations has no impact on the operation of the other reception and recording terrestrial stations and the device in general); it can be associated dynamically with one or more satellites and/or one or more constellations of satellites; it can be made available to users in an extremely simple, secure and reliable way, with all the possible and appropriate variants of access control for reading and/or writing and/or administering of the data recorded in the various stations.

Advantageously, a device according to the invention is also one wherein each reception and recording terrestrial station is furthermore associated with means for broadcasting data to at least one satellite, and which comprises at least one remote control module adapted to be able to generate at least one command intended for at least one satellite and to send such a command on the satellite grid. The device according to the invention can thus be used not only for the reception of satellite observation data and their distributed recording, but also for control of each satellite associated with the device according to the invention.

Advantageously and according to the invention, said digital network of said satellite grid comprises a public terrestrial digital network, in particular is a public terrestrial digital network such as the Internet.

Moreover, a device according to the invention is advantageously also one which comprises a terrestrial server, referred to as a geoportal server, connected by said digital network to said grid, this geoportal server being accessible to the users via this digital network and being adapted to manage authorizations for access to the grid by the users. Such a geoportal server is not, however, a central server for recording or referencing data. A device according to the invention is thus free of any central server or site for recording and/or referencing and/or distributing the observation data.

The invention extends to an observation device as mentioned above, which comprises a terrestrial device according to the invention formed by said reception and recording terrestrial stations. In other words, in an observation device according to the invention, all the reception and recording terrestrial stations are interconnected in order to form a terrestrial device (satellite grid) according to the invention.

Thus, in an observation device according to the invention, each reception and recording terrestrial station is functionally connected to at least one digital network and is provided with at least one module, referred to as a management module, adapted so that the various reception and recording terrestrial stations are interconnected with one another via said at least one digital network according to an architecture, called a satellite grid, adapted to allow permanent and transparent shared access to the observation data recorded in the storage means of the various reception and recording terrestrial stations, said satellite grid being adapted to be able to be accessible and viewed as a single computer resource from any access point of said at least one digital network.

The management modules of each reception and recording terrestrial station of a device according to the invention may be formed by grid modules, which are known per se, making it possible to produce computer grids, that is to say computer architectures based on a network and allowing transparent sharing, by heterogeneous systems and applications, data and/or computer resources (cf. in particular http://fr.wikipedia.org/wiki/Grid_computing, Globus ToolKit, or the software suites gLite (EGEE), UNICORE, or Synfiniway (Fujitsu), or the software e-mule). There is, however, likewise nothing to prevent specific grid modules being developed.

Computer grid technologies make it possible in particular to distribute and share large calculation capacities by networking and interconnection of powerful computer means. They are therefore used principally by research centers and enterprises having the need for large processing powers.

Although the calculation power is not a determining factor in the design of an observation device—in particular an instrument for observation of the Earth, the inventor has determined that the use of a grid technology for the permanent interconnection of terrestrial stations for reception and recording of observation data makes it possible to impart novel functionalities and, in fact, to obtain a distributed observation device making it possible to obtain unparalleled performances at an extremely reduced cost. In particular, the observation data can be distributed in the various reception and recording terrestrial stations and nevertheless be accessible from any access point of the network, immediately and in real time. Also, the observation data can be transmitted and/or exchanged between the reception and recording terrestrial stations fully transparently, according to requirements or imposed constraints. Likewise, the interconnection of reception and recording terrestrial stations in the form of a grid makes it possible to facilitate remote control of the constellation of satellites from the ground.

The invention is in particular advantageously applicable to the recording of Earth observation data. In particular, advantageously, a device according to the invention is also one wherein the observation data acquisition device of each satellite has a predetermined field of view corresponding to a region of the surface of the Earth visible to this acquisition device, and wherein each reception and recording terrestrial station comprises means for storing observation data coming from at least one terrestrial region, called a recorded observation region, comprising at least the envelope of the fields of view of the acquisition device of each satellite in which the reception antenna of the reception and recording terrestrial station is located, the number and the distribution of said various reception and recording terrestrial stations being adapted so that said corresponding recorded observation regions are complementary and permit coverage of a terrestrial surface to be observed, the various observation data corresponding to this surface to be observed being distributed in the storage means of the various reception and recording terrestrial stations, said satellite grid being a storage grid adapted so that all the observation data stored by the various reception and recording terrestrial stations are permanently accessible as a single computer resource from any access point of the digital network of said satellite grid.

It should be noted that in a device according to the invention, it is possible to create recorded observation regions associated with a reception and recording terrestrial station in a virtual fashion, not corresponding necessarily to the visibility circle of the reception antenna of the reception and recording terrestrial station nor to the fields of view of the satellites overflying this antenna. Thus, advantageously and according to the invention, the recorded observation region of at least one reception and recording terrestrial station comprises at least one region located outside the envelope of the fields of view of the satellites containing the reception antenna of the reception and recording terrestrial station. This makes it possible on the one hand for the observation data to be distributed optimally between the various reception and recording terrestrial stations, and to do so in terms of both the storage capacity and the efficiency of use of the observation data (in particular by minimizing the distance between each potential user and the reception and recording terrestrial station where the corresponding observation data are recorded, so as to reduce the occupancy of the network). But it also makes it possible for a satellite to be able to transmit the observation data to any one of the reception and recording terrestrial stations, which may or may not be the one which initially received these observation data from the satellite. This is because the grid architecture of the various reception and recording terrestrial stations allows automatic, simple and transparent routing of the observation data to the appropriate reception and recording terrestrial station, according to a predetermined protocol which may be of any type.

In an advantageous variant of the invention, each reception and recording terrestrial station is adapted to search for and incorporate into its storage means the observation data of each reception and recording terrestrial station whose recorded observation region is adjacent to its own, so that each reception and recording terrestrial station incorporates a local mosaic of the various recorded observation regions adjacent to its own.

Moreover, advantageously and according to the invention, the observation data are transmitted by each transmission device of a satellite according to a format incorporating metadata and/or data, referred to as geolocalization data, representative of the location of the observed region and the date of observation. Thus, in the case of terrestrial observations, the Earth observation data as transmitted by each satellite are "geolocalized", that is to say they incorporate information making it possible to determine the portion of the surface of the Earth to which they correspond, so that they can be automatically routed by the grid to a reception and recording terrestrial station on which they are to be recorded and, subsequently, automatically selected via the grid in response to a user request. In this regard, it should be noted that the observation data transmitted by a satellite undergo at least one processing operation by the reception and recording terrestrial station (the one associated with the reception antenna where they are received and/or the one where they are recorded) before they are recorded in the processing means of a reception and recording terrestrial station. Whatever the case, however, this processing preserves the geolocalization data.

Moreover, in an advantageous variant, a device according to the invention is also one wherein each reception and recording terrestrial station is furthermore associated with an antenna for broadcasting to a satellite, and wherein the reception and broadcasting antennas, the transmission devices of the satellites and the reception and recording terrestrial stations are adapted to make it possible to establish bidirectional exchanges between the satellites and the reception and recording terrestrial stations. In particular, this allows control of the constellation of satellites in a simple and decentralized way, so that it is no longer necessary to provide a single control centre, and commands can be sent to each satellite at all times from any access point of the grid. Thus, a device according to the invention advantageously comprises at least one remote control module adapted to be able to send commands to each satellite, and each remote control module is connected to said digital network and to the grid of reception and recording terrestrial stations, to which it addresses each command to be transmitted to a satellite.

In a first variant, the remote control module determines at least one reception and recording terrestrial station for which the command is intended, and which is responsible for sending this command to the target satellite.

In another variant, said commands are sent simultaneously by all the reception and recording terrestrial stations associated to a broadcasting antenna. Such a command is then received by each satellite from the reception and recording terrestrial station connected to the broadcasting antenna closest to the satellite. The command comprises an identification code of the satellite for which it is intended, and each satellite can determine whether or not this command is intended for it.

The spatial constellation of satellites may be connected to the satellite grid of reception and recording terrestrial stations using specific link and communication means which do not form an integral part of the digital network forming the satellite grid. Nevertheless, according to an advantageous and preferred variant of the invention, each satellite itself also comprises a grid module so as to be incorporated into the satellite grid formed by the various reception and recording terrestrial stations and the digital network which connects them.

Thus, in a device according to the invention, each satellite, like each reception and recording terrestrial station, is a node of the satellite grid, so that the communications are greatly facilitated and can benefit from all the advantages and all the advanced functionalities allowed by such a satellite grid (simplified and transparent management of the sharing of data, simplified management of the access of the various satellites to the various reception and recording terrestrial stations and vice versa, operational robustness, for example in the event of a breakdown of one of the satellites or one of the reception and recording terrestrial stations, etc).

Advantageously and according to the invention, the digital network of said satellite grid is a public terrestrial digital network, in particular the Internet, supporting in particular the links between the various reception and recording terrestrial stations. It has been noted in this regard that the nature of the physical communication links between the various nodes of a grid is not important, and may be of any type and variable within the same grid (wire links, fiber-optic links, links via communications satellites, cellular links of the GSM type or the like, etc). In fact, a grid module is a software layer added on to one or more network(s) in operation and compatible with all the formats of networks and platforms.

Moreover, an observation device according to the invention advantageously comprises a terrestrial server, referred to as a geoportal server, connected by said public digital network to said satellite grid, this geoportal server being accessible to the users via this public digital network and being adapted to manage authorizations for access to the grid by the users. In this regard, it should be noted that such a geoportal server does not constitute a central site or a central server in which the observation data to be delivered to the users are stored, all which would be necessary in order to determine the recording location of observation data forming the subject of a user request and/or in order to migrate said observation data to each user. In fact, in a device according to the invention, the grid makes it possible to share the observation data transparently and automatically with each user connected to this grid, without requiring any central site for selecting or transmitting the information. In an observation device according to the invention, the geoportal server has only the function of managing the users' access control to the grid forming the device.

Preferably, in an observation device according to the invention, said observation data being data capable of being displayed in the form of images, each reception and recording terrestrial station is adapted to process the observation data which it receives from each satellite, so as to form and record in its storage means corresponding images which can be employed directly by a user, the satellite grid thus formed making all the observation images, coming from the various satellites for the various observation regions and recorded in the various reception and recording terrestrial stations, directly accessible to the user. In particular, each reception and recording terrestrial station keeps up to date in its own storage means a local mosaic formed by its own recorded observation region and the various adjacent recorded observation regions of other reception and recording terrestrial stations, the various corresponding observation data being formatted, calibrated and processed uniformly in order to be able to be directly employable by the users.

In this regard, several variants of the invention are possible. According to a first alternative embodiment according to the invention, the management module of each reception and recording terrestrial station is adapted to make dynamically available in real time the observation data as recorded most recently in the storage means on the satellite grid. In other words, in this alternative embodiment, each user can obtain the most recent observation data of any observation region via the geoportal server, as received and recorded most recently in the corresponding reception and recording terrestrial station. This alternative embodiment makes it possible to permanently provide the most recent image of the various observation regions scanned by the constellation of satellites, and therefore of the Earth if the number of satellites of the constellation is sufficient.

In a second variant, on the other hand, there is nothing to prevent the various observation data received by the various reception and recording terrestrial stations from being the subject of periodic collective processing, for example every day or every week, so as to be dated in order to form a complete set of up-to-date observation data made available to the users, for example in order to provide data via the geoportal service, in the form of a representation of the Earth.

The invention applies in particular to a device making it possible to obtain observation of the entire surface of the Earth with the characteristics mentioned above. Thus, advantageously and according to the invention, each satellite has a footprint F and a low orbit so that it can describe a number ORB of orbits greater than 1 in one day, and the number of satellites is adapted so that the terrestrial surface to be observed corresponds to the entire surface of the Earth. The invention nevertheless also applies to other constellations of satellites which are more limited in their observation scope and/or for observing space.

The invention thus represents a breakthrough in the design of Earth observation devices, based on a transparent, permanent and automatic interconnection grid of its various constituent parts (reception and recording terrestrial stations and/or satellites and/or antennas), this grid constituting the essential element of the observation device.

The invention also relates to a device—in particular an observation device—characterized in combination by all some of the characteristics mentioned above or below.

Other characteristics, objects and advantages of the invention will become apparent on reading the following description which presents an embodiment of the invention by way of non-limiting example, with reference to the appended drawings; in these drawings:

For reasons of illustration and clarity, the scales and the proportions are not respected in the figures.

Figure 1:
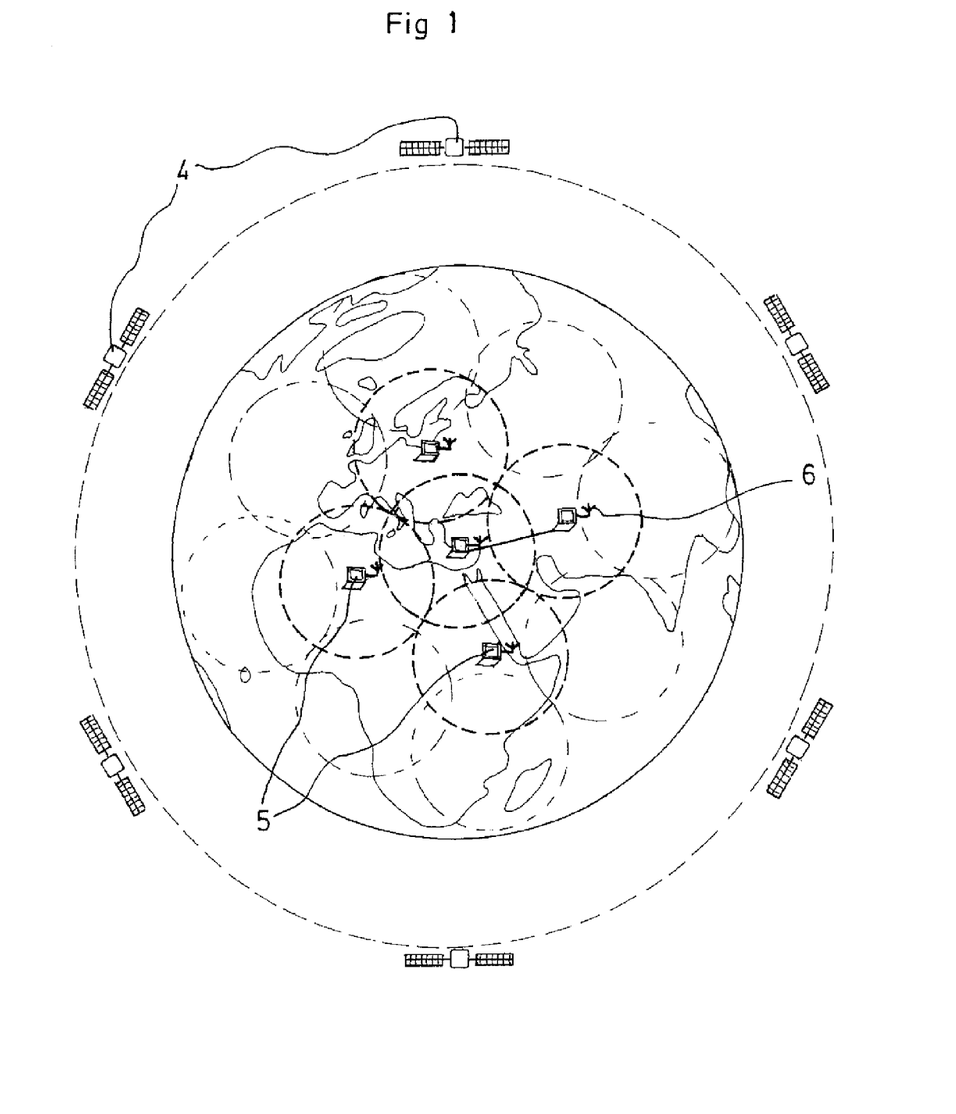
FIG. 1 is a schematic view of a device for acquisition and distribution of Earth observation data according to an embodiment of the invention.

As represented in FIG. 1, an Earth observation device according to the invention comprises a constellation of satellites 4 and a plurality of data reception and recording terrestrial stations 5 communicating with one another, forming a terrestrial device according to the invention referred to as a satellite grid.

Each satellite 4 furthermore comprises at least one device—in particular an optical device—for observation data acquisition with fixed sighting.

Such an observation data acquisition device is, for example, a fixed camera oriented toward the Earth and adapted to acquire multispectral observation data—in particular images—of regions of the terrestrial atmosphere and/or surface over which the satellite 4 flies.

According to a possible embodiment of the invention, such a satellite is an optical parachute as described for example in WO2005110848. Thus, a satellite 4 of a device according to the invention does not require a particular alignment program, which substantially reduces the costs of manufacture and maintenance.

Each satellite 4 furthermore comprises at least one module for sending observation data, which is adapted to send, after each observation data acquisition by an observation data acquisition device of the satellite 4, the acquired observation data to the terrestrial layer (station 5). Such a broadcasting module may be of any known type, and is not described in detail here.

The device according to the invention comprises a plurality of reception and recording terrestrial stations 5 forming a satellite grid.

Figure 3:
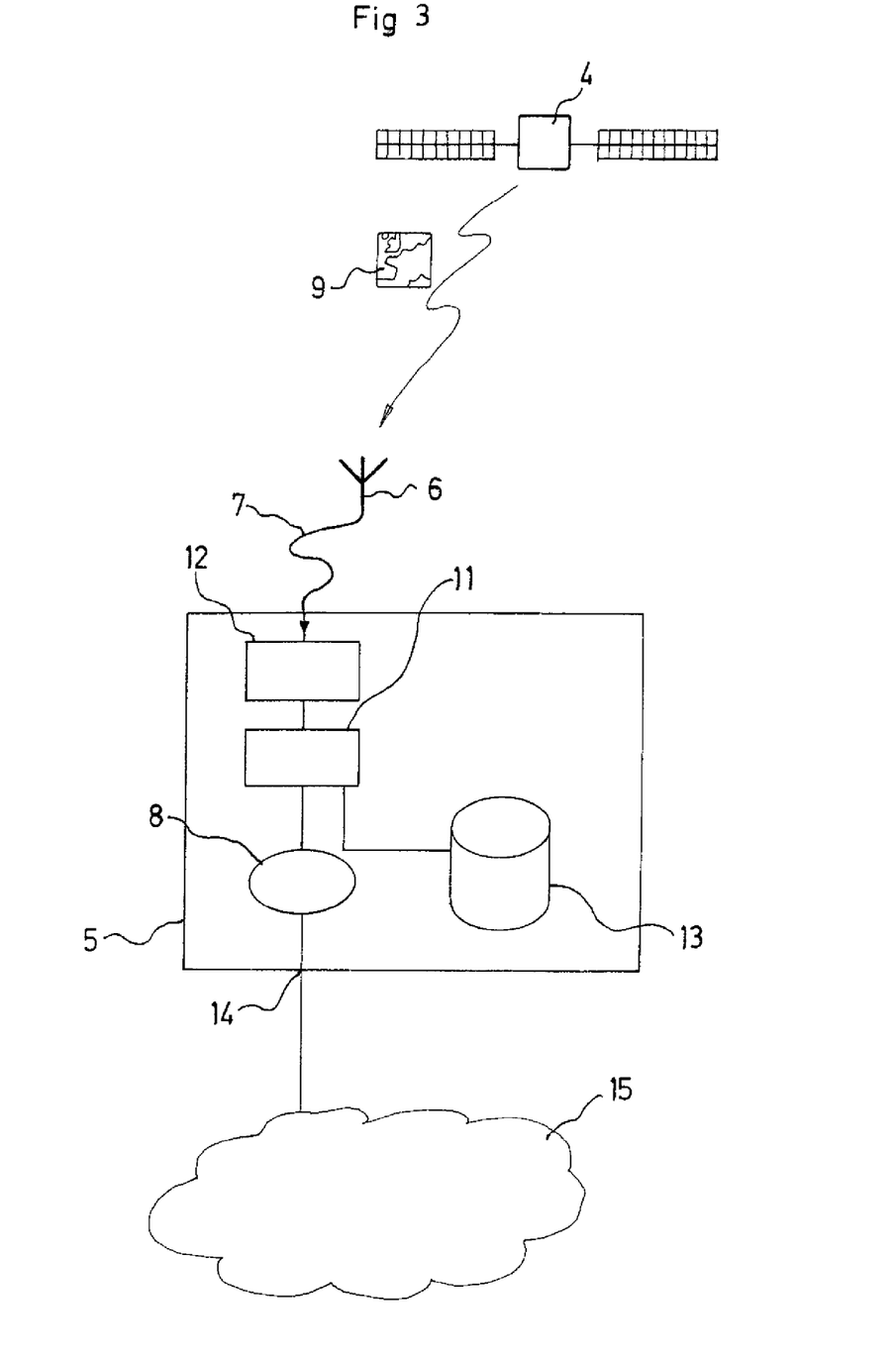
FIG. 3 is a schematic view of a reception and recording terrestrial station of a satellite grid according to an embodiment of the invention.

Each reception and recording terrestrial station 5 comprises at least one observation data reception module 12 adapted to receive observation data coming from the spatial layer of observation data acquisition.

As represented in FIG. 3, each recording terrestrial station 5 furthermore comprises a processing unit 11 adapted to process the observation data 9 received by the reception module 12 of this recording terrestrial station 5.

An observation data processing unit 11 of a recording terrestrial station 5 is, for example, a computational processing unit, in particular of the microcomputer type, comprising hardware and software means for processing information (microprocessor(s), associated read-only and random-access memory/memories, operating system and other software applications, peripherals and peripheral drivers, corresponding cards and buses, human-machine interface, etc.). In particular, the unit 11 is adapted to be able to carry out the processing and recording of the observation data, and the connection to at least one digital network 15.

Each recording terrestrial station 5 comprises in particular means 13 for storing the observation data processed by the processing unit 11. These storage means 13 are locally connected to the processing unit and may be of any type. For example, these storage means 13 are formed by a bulk memory such as a memory having one or more hard disks.

Each recording terrestrial station 5 also comprises a connection 14 to a digital network 15, so as on the one hand to be connected to the other recording terrestrial stations 5 and on the other hand to be able to make the observation data stored by its storage means 13 available to users connected to this digital network 15, optionally after authorization by a server referred to as a geoportal server, which is itself also connected to the digital network 15 and allows administrative and financial management of the authorizations of access to the grid by users.

This connection 14 of each recording terrestrial station 5 to the digital network 15 is managed by means of a module, referred to as a management module 8, loaded and executed by the processing unit 11 of each reception and recording terrestrial station 5, so that the various reception and recording terrestrial stations 5 are permanently interconnected with one another via said digital network 15 according to a grid computer architecture which allows transparent and permanent sharing of computer resources, and in particular transparent and permanent shared access to the observation data (coming from the constellation of satellites 4) recorded in the storage means 13 of the various recording terrestrial stations 5. The principal function of each recording terrestrial station 5 thus consists in making it possible on the one hand to store the observation data on a local bulk memory (storage means 13), and on the other hand to interconnect and share for reading these observation data via the satellite grid, so that they can be viewed from any point of access to this satellite grid.

Figure 2:
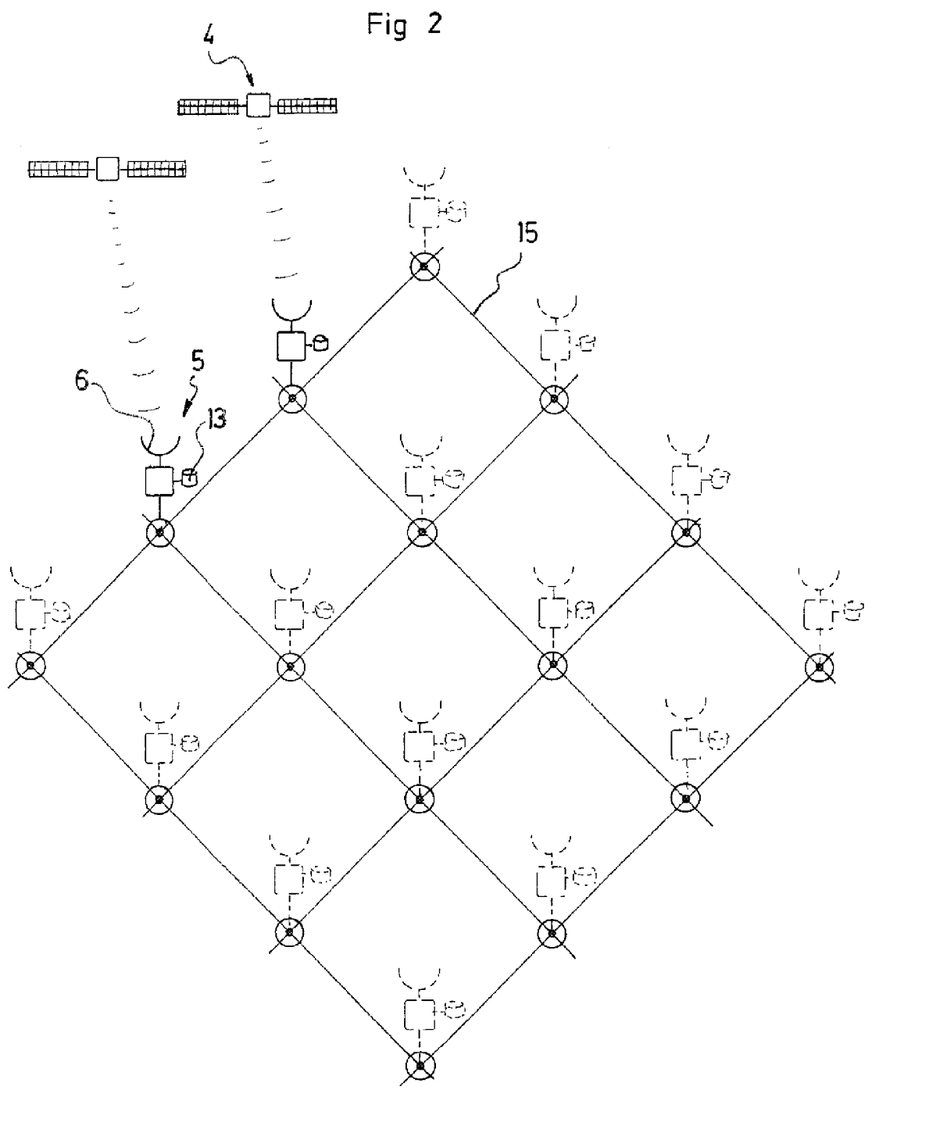
FIG. 2 is a schematic view of a terrestrial device forming a satellite grid according to an embodiment of the invention.

Thus, the various reception and recording terrestrial stations 5 interconnected via the digital network 15 form a satellite grid accessible from any point of access to said digital grid 15 and viewed, from such an access point, as a single and global computer resource. In particular, a user authorized by the geoportal server to formulate a request relating to the observation data, for example observation data of a given region of the terrestrial surface, accesses directly or via the geoportal server the entire grid thus formed, so that their corresponding observation data are accessible for reading, and optionally can be downloaded to the user, transparently via the grid irrespective of the source recording terrestrial station 5 where this information is stored.

Therefore, in an observation device according to the invention, the satellite grid formed by the various reception and recording terrestrial stations 5, as well as the digital network 15, are in fact an integral part of this observation device, in as much as the functionalities of the observation device are lost, or in any event greatly degraded, if all or some of the grid is not operational. Such a satellite grid is represented schematically in FIG. 2.

The management module 8 may be formed by any known computer grid module, in particular Globus ToolKit, or selected from among the software suites gLite (EGEE), UNICORE, or Synfiniway (Fujitsu), or the software e-mule (www.emule-project.net).

Each reception and recording terrestrial station 5 is connected to at least one reception antenna 6—in particular to a single antenna 6 which belongs to it—by a link 7. This link may be of any type. For example, this link 7 may be a wire link, a wireless radio link, wifi, etc.

The reception antennas 6 may be more or less distant from the recording terrestrial stations 5. Preferably, each recording terrestrial station locally comprises a reception antenna 6. As a variant, each reception antenna 6 forms part of an independent reception station comprising a computational processing unit to which the reception antenna 6 is connected and which is separate from that of the recording terrestrial station 5. In this case, each reception station is connected to the computer network 15 and also comprises a management module 8 so as to be incorporated into the satellite grid and therefore interconnected with the recording terrestrial stations 5.

The satellite grid formed in this way, of a device according to the invention, firstly has the function of making the observation data stored in each bulk memory 13 of each recording terrestrial station 5 available on the digital network 15 automatically, transparently and in real time.

Furthermore, and in the most frequent case in which these observation data are adapted to be able to be displayed in the form of images, these observation data are processed as images directly available for the user, and each recording terrestrial station 5 is adapted to be able to store in its bulk memory 13 not only the observation data corresponding exactly to its circle of visibility, but also all the observation data corresponding to the immediately adjacent recording terrestrial stations 5, that is to say ones whose circle of visibility adjoins that of the recording terrestrial station 5. Thus, each recording terrestrial station 5 keeps in its bulk memory 13 a local mosaic of all the observation data corresponding to its recorded observation region and the boundaries between this region in its recorded relation and the immediately adjacent regions. Furthermore, this local mosaic of each recording terrestrial station 5 is directly accessible via the grid for a user.

The satellite grid thus formed also makes it possible, in the opposite direction, to carry out remote control of the satellites 4 in an extremely simple and reliable way. To this end, each recording terrestrial station 5 (or at least some of them) is also associated with a broadcasting antenna capable of establishing an uplink to any satellite 4 passing through the region of visibility of this broadcasting antenna. Such a broadcasting antenna may form an integral part of the recording terrestrial station 5 or, as a variant as described above in relation to the reception antenna 6, form part of a separate independent broadcasting station itself connected to the satellite grid and provided with a management module 8.

The sending of such a remote control command to a satellite 4 via the satellite grid is extremely simple. Specifically, this remote control command may first be constructed by an appropriate remote control module which is well known per se, and targeted for one or more satellites 4. The remote control module may itself determine on the one hand each target satellite, and on the other hand each terrestrial station 5 responsible for sending this remote control command, and insert identification data of each target satellite and/or each reception and recording terrestrial station into the address and/or the metadata and/or the data of the remote control command. As a preferred variant, the remote control module broadcasts the remote control command on the grid, and each of the terrestrial stations 5 of the grid which is associated with at least one broadcasting antenna is adapted to send this remote control command to each satellite passing through the broadcasting field of this broadcasting antenna, the various satellites 4 receiving the remote control command and each satellite 4 determining whether or not this remote control command is intended for it.

The number and the distribution of the reception antennas 6, and optionally the broadcasting antennas, on the surface of the Earth and the constellation of satellites 4 are adapted so that:

each satellites 4 flies over at least one reception antenna 6, and optionally at least one broadcasting antenna, each reception antenna 6, and optionally each broadcasting antenna, is overflown by at least one satellite 4.

According to a preferred embodiment of the invention, the device furthermore comprises M reception and recording terrestrial stations, where $$M = \alpha \cdot \left(\frac{C}{\pi \cdot r}\right)^2,$$

r being the average radius of the circles of visibility associated with the reception antennas 6 connected to the reception modules 12 of the recording terrestrial stations 5, and α being a pre-determined coefficient making it possible to ensure overlap of the circles of visibility.

α is a coefficient which makes it possible to ensure overlap of the various circles of visibility of the antennas associated with the reception modules. In practice, α lies between 1.1 and 1.25, which makes it possible to obtain overlap factors of between 10% and 25% for the regions of visibility.

Thus, whatever its position, a satellite is visible to at least one reception antenna 6.

According to a preferred embodiment, the coefficient α is fixed at 1.2, which makes it possible to obtain an overlap factor of 20%.

According to a preferred embodiment of the invention, the number of recording terrestrial stations 5 of the terrestrial observation data recording device is equal to the number of satellites 4 of the spatial layer 1 of observation data acquisition.

A reception antenna 6 associated with a reception module 12 of a recording terrestrial station 5 may be of any type. In particular, an antenna 6 may have various circles of visibility, in particular as a function of its elevation. According to one embodiment of the invention, each antenna 6 has a circle of visibility equal to 2500 km.

According to this embodiment, a device according to the invention may comprise twenty-five antennas 6 associated with twenty-five reception and recording terrestrial stations distributed over the surface of the Earth.

In the case in which the digital network 15 is the Internet, a device according to the invention is particularly easy and economical to set up.

Furthermore, in the case in which the reception 6 and/or broadcasting antennas are remote from the recording terrestrial stations 5, the links between the reception and/or broadcasting stations of these antennas, and the recording terrestrial stations 5, are also formed advantageously by the digital network 15, and preferably by the grid formed by the recording terrestrial stations 5 and the digital network 15, that is to say the stations of the antennas are themselves connected to the digital network 15 and provided with a grid module 8 configured so that all the information and data passing through each antenna are managed by this management module 8, and therefore shared on the satellite grid. In particular, the management modules 8 are configured to have at least one directory of the processing unit 11 dedicated to recording the observation data, and to allow access at least for reading to this directory from any user access on the satellite grid.

Advantageously and according to the invention, the satellites 4 are also themselves each provided with a processing unit with a management module 8, so that they are integrated into the grid formed by the recording terrestrial stations 5 and the digital network 15, via the communication links established between the satellites 4 and the recording terrestrial stations 5. Thus, in a device according to the invention, the satellites 4 can be configured in order to make observation data available on the grid, so that this information is directly assessable to the recording terrestrial stations 5 which can subsequently process it in order to record it in their specific storage means 13, in particular as images directly accessible to the users.

In other words, an observation device according to the invention can be viewed as a network grid comprising a plurality of servers formed, on the one hand, by the recording terrestrial stations 5, reception antennas 6 and/or broadcasting antennas and, on the other hand, by satellites 4 in orbit for acquisition of observation data.

The communications between the spatial layer of observation data acquisition and the terrestrial observation data recording device may be of any type.

For example, according to a preferred embodiment of the invention, the communications between the spatial layer of observation data acquisition and the terrestrial observation data recording device use an UMTS protocol.

According to other embodiments, the communications may use other protocols, for example the protocols based on future technologies such as the OFDM technology (Orthogonal Frequency Division Multiplexing) or the HSPA technology (High Speed Downlink Package Access).

According to a preferred embodiment of the invention, the observation data are compressed on board the satellites 4 before being sent to the terrestrial observation data recording device. This compression may be of any type, for example JPEG compression.

An observation device according to the invention makes it possible, for example, to take daily metric images of the entire Earth in a simple and economical way.

These images may advantageously be distributed by means of the grid, but if necessary under the control of a server to which approved users connect.

To this end, and as indicated above, a device according to the invention advantageously comprises a server, referred to as a geoportal server, connected by the public digital network 15 to the grid of recording terrestrial stations 5.

The server comprises means for receiving a connection request coming from a remote user, means for analyzing this request, means for verifying the access rights of this user, and means for authorizing or denying access to the grid by this user.

It should nevertheless be noted that such a geoportal server does not, however, in any way constitute a central site or a central server on which the various information is stored or managed, since on the contrary the various information or images accessible to the users are processed and distributed in the storage means 13 of the various recording terrestrial stations 5 interconnected by the grid.

The image of the Earth obtained by an observation device according to the invention is distributed over the surface of the Earth. For a user, on the other hand, this distribution is transparent, given that the observation data forming the subject of a request by a user via a grid module belonging to him are automatically migrated and made available to the user via the grid.

Such a geoportal server is for example a microcomputer comprising calculation means, storage means, and software for analyzing requests and processing requests, etc.

An observation device according to the invention makes it possible to acquire and provide information, in particular images of terrestrial observation which have high spatial and temporal resolutions, in particular of the order of one meter and one day respectively.

An observation device according to the invention physically distributes all the acquired observation data over the Earth, which makes it possible to migrate and process the data. In particular, the bandwidths used are compatible with the technologies available today.

An observation device according to the invention does not require any realignment of the observation data acquisition devices on board the satellites.

Furthermore, an observation device according to the invention does not require any central server for recording and/or referencing and/or distributing the observation data. The observation data are constantly distributed over the Earth and stored in the storage means of the various reception and recording terrestrial stations.

A device according to the invention is particularly suitable for providing observation data of the Earth to users connected to a public digital network of the Internet type. In particular, a device according to the invention allows any user connected to this network to recover an image of a portion of the Earth having a resolution of the order of one meter and less than one day old. The invention therefore opens the way for many new applications, particularly in the fields of agriculture, cartography, security, defense, the environment, urban planning, telecommunications, risk management, renewable resource management, etc.

The invention may be the subject of numerous variants which have not been specifically described. In particular, a device according to the invention may comprise other observation data acquisition devices arranged on board other flying platforms, or even arranged at the top of terrestrial buildings, such as tower blocks, and transmit acquired observation data to the observation data processing layer by means of the telecommunications layer. This telecommunications layer may also comprise various additional devices for conveying the observation data from the observation data acquisition layer to the terrestrial device according to the invention for recording observation data. These additional devices are for example relay antennas, intermediate networks, etc. The terrestrial device according to the invention for recording observation data may comprise a wide variety of reception and recording terrestrial stations distributed over the surface of the Earth. These reception and recording stations may be microcomputers connected to a public network such as the Internet, and in general any device adapted to receive an image (or other observation data), process the image, record it in bulk memory and make it available to users of the network.

Moreover, the recording terrestrial stations 5 may be connected to a plurality of digital networks, and in particular to at least one digital network other than the Internet, for example to a specific digital network (even though this specific digital network may itself be based wholly or in part on communications via the Internet). Furthermore, the terrestrial device according to the invention may be used not only with a constellation of satellites 4 as described above, but also if necessary with a plurality of constellations of satellites in parallel. For example, the same terrestrial device according to the invention may receive both observation data delivered by a first constellation of satellites carrying out observations in the visible range, and on the other hand observations coming from a second constellation of satellites, for example carrying out observations of space and/or physical parameters of the terrestrial environment, for example magnetic field measurements and/or observations in the microwave range, etc.

The invention claimed is:

1. A device comprising a plurality of data reception and recording terrestrial stations provided with storage means for storing data, each terrestrial station being associated with means for receiving observation data coming from at least one satellite in orbit around the Earth, wherein:

the observation data received from at least one satellite are and remain distributed in said storage means of the various reception and recording terrestrial stations, each reception and recording terrestrial station is functionally connected to the other reception and recording terrestrial stations by at least one digital network and is provided with at least one module, called a management module, adapted so that the various reception and recording terrestrial stations are interconnected with one another by the various management modules via said at least one digital network, according to an architecture called a satellite grid, adapted to allow permanent and transparent shared access to said observation data coming from at least one satellite, which are recorded in a distributed fashion in said storage means of the various reception and recording terrestrial stations, said satellite grid being adapted to make all the observation data recorded in a distributed fashion in the various reception and recording terrestrial stations accessible and viewed as a single set of observation data from any access point of said at least one digital network.

2. The device as claimed in claim 1, wherein each reception and recording terrestrial station is furthermore associated with means or sending data to at least one satellite, and wherein it comprises at least one remote control module adapted to be able to generate at least one command intended for at least one satellite (4) and to send such a command on said satellite grid.

3. The device as claimed in claim 1, wherein said at least one digital network of said satellite grid comprises a public terrestrial digital network.

4. The device as claimed in claim 1, wherein said observation data being data adapted to be displayed in the form of images, each reception and recording terrestrial station is adapted to process the observation data which it receives from each satellite, so as to form and record in its storage means corresponding images which can be employed directly by a user, the satellite grid thus formed making all the observation images recorded in the various reception and recording terrestrial stations directly accessible to the user.

5. The observation device as claimed in claim 1, which comprises:

at least one constellation of satellites deployed in orbit around the Earth, each satellite comprising at least one observation data acquisition device, and at least one transmission device for transmitting these observation data to reception antennas located on the surface of the Earth, each reception and recording terrestrial station being associated with at least one reception antenna, said transmission device of each satellite being adapted to be able to transmit observation data to any reception antenna located in a field of view of this transmission device, each reception antenna being adapted to be able to receive observation data transmitted by a satellite when said reception antenna is located in the field of view of the transmission device of said satellite.

6. The observation device as claimed in claim 5, wherein the observation data acquisition device of each satellite is adapted to acquire observation data of the Earth and has a predetermined field of view corresponding to a region of the surface of the Earth visible to this acquisition device, and wherein each reception and recording terrestrial station comprises storage means for storing observation data coming from at least one terrestrial region, called a recorded observation region, comprising at least the envelope of the fields of view of the acquisition device of each satellite in which the reception antenna of the reception and recording terrestrial station is located, the number and the distribution of the various reception and recording terrestrial stations being adapted so that said corresponding recorded observation regions are complementary and permit coverage of a terrestrial surface to be observed, the various observation data corresponding to this surface to be observed being distributed in the storage means of the various reception and recording terrestrial stations, said satellite grid being a storage grid adapted so that all the observation data stored by the various reception and recording terrestrial stations are permanently accessible as a single computer resource from any access point of said at least one digital network of said satellite grid.

7. The observation device as claimed in claim 6, wherein the recorded observation region of at least one reception and recording terrestrial station comprises at least one region located outside the envelope of the fields of view of the satellites containing the reception antenna of the reception and recording terrestrial station.

8. The observation device as claimed in claim 6, wherein each reception and recording terrestrial station is adapted to search for and incorporate into its storage means the observation data of each reception and recording terrestrial station whose recorded observation region is adjacent to its own, so that each reception and recording terrestrial station incorporates a local mosaic of the various recorded observation regions adjacent to its own.

9. The observation device as claimed in claim 6, wherein each transmission device of a satellite is adapted to transmit the observation data according to a format incorporating metadata and/or data, referred to as geolocalization data, representative of the location of the observed region and the date of observation.

10. The observation device as claimed in claim 6, wherein each reception and recording terrestrial station is furthermore associated with an antenna for broadcasting to a satellite, and wherein the reception and broadcasting antennas, the transmission devices of the satellites and the terrestrial stations are adapted to make it possible to establish bidirectional exchanges between the satellites and the terrestrial stations.

11. The observation device as claimed in claim 10, which comprises at least one remote control module adapted to make it possible to send commands to each satellite, and wherein each remote control module is connected to said at least one digital network and to the satellite grid of reception and recording terrestrial stations, to which it addresses each command to be transmitted to a satellite, said command being sent simultaneously by all the reception and recording terrestrial stations.

12. The observation device as claimed in claim 5, wherein each satellite also comprises a management module so as to be incorporated into the satellite grid formed by the various reception and recording terrestrial stations and the digital network which connects them.

13. The observation device as claimed in claim 5, wherein said satellite grid is connected to a public terrestrial digital network.

14. The observation device as claimed in claim 5, wherein each reception and recording terrestrial station is adapted to process the observation data which it receives from each satellite so as to form and record in its storage means corresponding images which can be employed directly by a user, the satellite grid thus formed making all the observation images coming from the various satellites directly accessible to a user for the various observation regions recorded in the various reception and recording terrestrial stations.

15. The observation device as claimed in claim 5, wherein the management module of each reception and recording terrestrial station is adapted to make dynamically available the observation data as recorded most recently in the storage means on the satellite grid.

* * * * *

UNITED STATES PATENT AND TRADEMARK OFFICE
CERTIFICATE OF CORRECTION

PATENT NO. : 8,565,670 B2
APPLICATION NO. : 13/061197
DATED : October 22, 2013
INVENTOR(S) : Jean-Pierre Antikidis Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

Fifteenth Day of September, 2015

Michelle K. Lee
*Director of the United States Patent and Trademark Office*